United States Patent
Ohtsu

(10) Patent No.: US 9,584,970 B2
(45) Date of Patent: Feb. 28, 2017

(54) TERMINAL DEVICE, BASE STATION DEVICE, COMMUNICATION SYSTEM, AND COMMUNICATION METHOD ADAPTED TO TRANSMIT LOCATION INFORMATION

(71) Applicant: JVC KENWOOD Corporation, Yokohama-shi (JP)

(72) Inventor: Shinichiro Ohtsu, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 14 days.

(21) Appl. No.: 14/636,871

(22) Filed: Mar. 3, 2015

(65) Prior Publication Data

US 2015/0304980 A1 Oct. 22, 2015

(30) Foreign Application Priority Data

Apr. 22, 2014 (JP) ................. 2014-088563

(51) Int. Cl.
*H04W 24/00* (2009.01)
*H04W 4/02* (2009.01)
*H04W 24/10* (2009.01)

(52) U.S. Cl.
CPC ............ *H04W 4/021* (2013.01); *H04W 4/028* (2013.01); *H04W 24/10* (2013.01)

(58) Field of Classification Search
CPC ............................... H04W 64/00; H04W 24/10

USPC ...................................................... 455/456.3
See application file for complete search history.

(56) References Cited

U.S. PATENT DOCUMENTS

| | | | | |
|---|---|---|---|---|
| 2006/0089152 A1* | 4/2006 | Mahonen | ................ | H04W 4/02 455/456.1 |
| 2011/0124317 A1* | 5/2011 | Joo | ......................... | H04L 63/18 455/411 |
| 2013/0210413 A1* | 8/2013 | Adler | ................ | H04M 3/42178 455/418 |
| 2015/0341891 A1* | 11/2015 | Pentti | .................... | H04W 4/021 455/456.1 |

FOREIGN PATENT DOCUMENTS

JP 2009-089092 A 4/2009

\* cited by examiner

*Primary Examiner* — Timothy Pham
(74) *Attorney, Agent, or Firm* — Venable LLP; Michael A. Sartori; David M. Klecyngier

(57) ABSTRACT

A retrieval unit retrieves location information. A storage stores location information transmitted from a transmitter. A derivation unit derives a distance of travel based on the location information stored in the storage and the location information newly retrieved by the retrieval unit. A controller causes the transmitter to transmit the location information newly retrieved by the retrieval unit, if the distance of travel exceeds a threshold value.

5 Claims, 6 Drawing Sheets

TERMINAL DEVICE, BASE STATION DEVICE, COMMUNICATION SYSTEM, AND COMMUNICATION METHOD ADAPTED TO TRANSMIT LOCATION INFORMATION

BACKGROUND OF THE INVENTION

1. Field of the Invention

The present invention relates to a communication technology and, more particularly, to a terminal device, base station device, communication system, and communication method adapted to transmit location information.

2. Description of the Related Art

The current location of a terminal device of a cell phone system is retrieved so that services adapted to the area including the current location are provided. For example, a terminal device periodically retrieves information indicating the current location of the device using a Global Positioning System (GPS) and transmits the location information to a server device. The server device determines an area in which the terminal device is located based on the received location information. In order to prevent an increase in the traffic for transmission of the location information, the server device transmits area information in advance. If the retrieved location information is included in a range indicated by the area information, the terminal device stops transmitting the location information (see, for example, patent document 1).

[patent document 1] JP2009-89092

Where area information is transmitted to control transmission from a terminal device, the larger the number of areas for which transmission should be controlled, the larger the number of items of area information, i.e., the data size. Also, transmission for a given area should be controlled in some cases but need not be controlled in other cases. Transmission of area information to suit different cases also increases the data size and traffic.

SUMMARY OF THE INVENTION

The present invention addresses this issue and a purpose thereof is to provide a technology capable of preventing an increase in the traffic load in the transmission of location information from a terminal device.

To address the aforementioned issue, the terminal device according to an embodiment of the present invention comprises: a retrieval unit that retrieves location information; a communication unit that transmits the location information retrieved by the retrieval unit to a base station and receives from the base station a threshold value for a distance of travel; a storage that stores the location information transmitted from the communication unit; a derivation unit that derives the distance of travel based on the location information stored in the storage and the location information newly retrieved by the retrieval unit; and a controller that causes the communication unit to transmit the location information newly retrieved by the retrieval unit, if the distance of travel derived by the derivation unit exceeds the threshold value.

Another embodiment of the present invention relates to a base station device. The base station device comprises: a communication unit that performs communication with a terminal device; a measurement unit that measures a traffic of communication in the communication unit; and a controller that determines a threshold value for a distance of travel of the terminal device in accordance with the traffic measured by the measurement unit and causes the communication unit to transmit the determined threshold value to the terminal device. The communication unit receives location information that is transmitted if the terminal device travels beyond the threshold value, and the controller controls the threshold value such that the heavier the traffic, the larger the threshold value.

Still another embodiment of the present invention relates to a communication system. The communication system comprises: a base station device; and a terminal device that transmits retrieved location information to the base station device and receives from the base station device a threshold value for a distance of travel. The base station device includes: a measurement unit that measures a traffic of communication with the terminal device; and a controller that determines a threshold value such that the heavier the traffic measured by the measurement unit, the larger the threshold value, and transmits the determined threshold value to the terminal device. The terminal device includes: a storage that stores the transmitted location information; a derivation unit that derives the distance of travel based on the location information stored in the storage and the newly retrieved location information; and a controller that causes the newly retrieved location information to be transmitted, if the distance of travel derived by the derivation unit exceeds the threshold value.

Yet another embodiment of the present invention relates to a communication method. The method comprises: transmitting, in a terminal device, retrieved location information to a base station device and receiving from the base station a threshold value for a distance of travel; measuring, in the base station, a traffic of communication with the terminal device, determining a threshold value such that the heavier the measured traffic, the larger the threshold value, and transmitting the determined threshold value to the terminal device; and storing, in the terminal device, the transmitted location information in a memory, deriving the distance of travel based on the location information stored in memory and the newly retrieved location information, and causing the newly retrieved location information to be transmitted, if the derived distance of travel exceeds the received threshold value.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
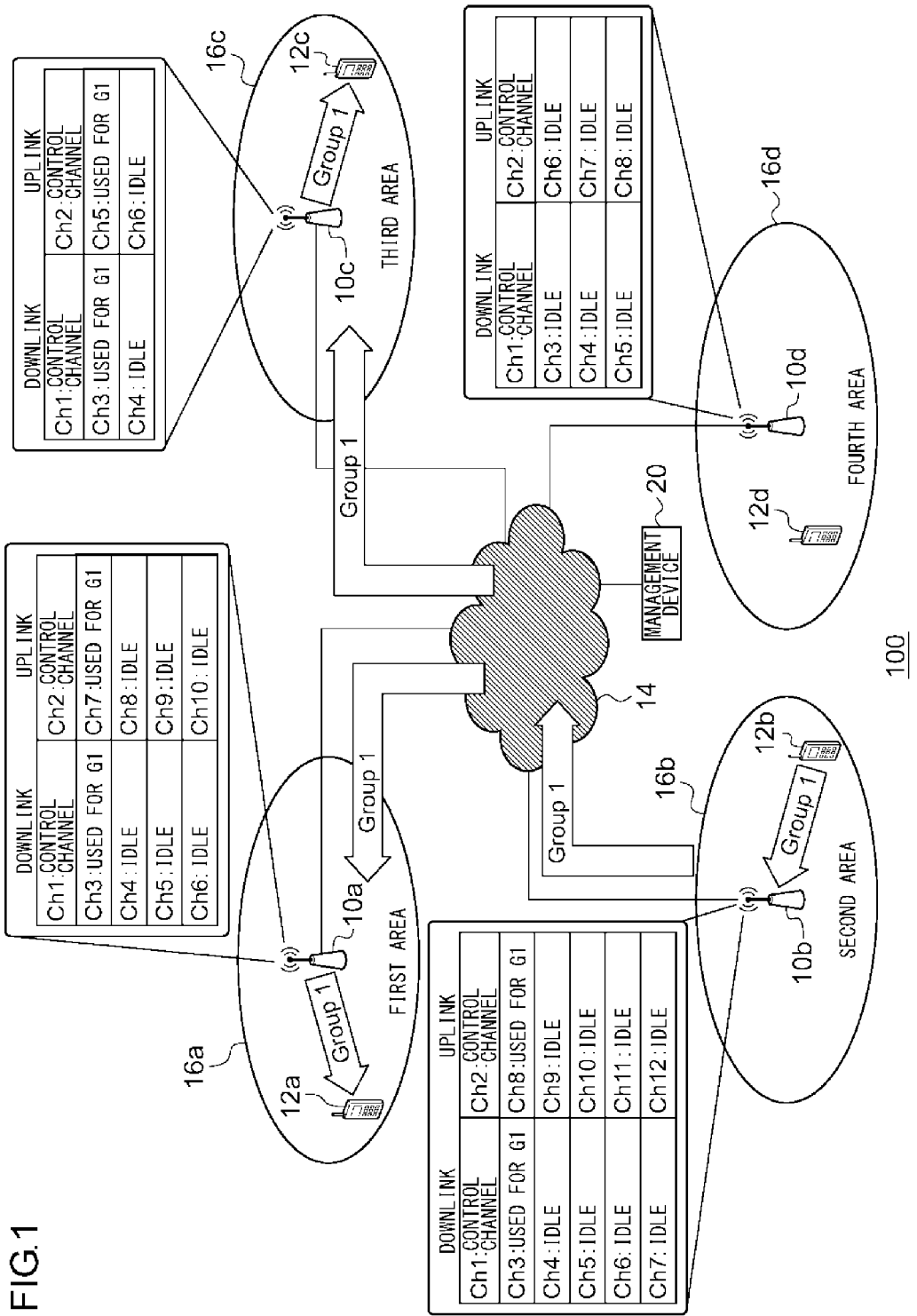
FIG. 1 shows the configuration of a business wireless system according to an embodiment of the present invention.

The invention will now be described by reference to the preferred embodiments. This does not intend to limit the scope of the present invention, but to exemplify the invention.

A summary of the present invention will be given before describing the invention in specific detail. An embodiment of the present invention relates to a plurality of base station devices connected to a network, a plurality of terminal devices connected to the respective base station devices, and a business wireless system that includes a management device connected to the network. In the business wireless system, the plurality of terminal devices form a group. The base station device assigns an uplink channel and a downlink channel to a group. In this setup, one of the terminal devices in a group (hereinafter, referred to as "transmitting device") transmits a signal using the uplink channel, and another terminal device in the group receives the signal using the downlink channel. Base station devices other than the base station device to which the transmitting device is connected also assign a downlink channel to the group so that the receiving device connected to the other base station device can also receive the signal. A similar process is performed in the other groups but communication between different groups does not take place.

The business wireless system built as described above may provide services suited to the location at which the terminal device is located. For this purpose, the terminal device uses the GPS to retrieve location information indicating the location at which the device is located and transmits the retrieved location information to the base station device. If the communication traffic in the base station device is large, the traffic is further increased due to the transmission of the location information, which might adversely affect the intrinsic communication. Meanwhile, it is desirable to transmit the location information of the terminal device frequently in order to improve the quality of services suited to the location. To meet both of these requirements, the business wireless system according to the embodiment performs the following process.

The base station device measures the traffic and defines a threshold value determined by the traffic. For example, the base station device defines a threshold value such that the heavier the traffic, the larger the threshold value. The base station device broadcasts the threshold value thus defined. The terminal device derives a distance of travel by calculating a difference between the location information already transmitted and new location information. If the distance of travel is larger than the threshold value, the terminal device transmits the new location information to the terminal device. If the distance of travel is not larger than the threshold value, the terminal device does not transmit the new location information. A larger threshold value requires a larger distance of travel for transmission of the location information. This is equivalent to fewer opportunities to transmit the location information. A larger threshold value translates into heavier traffic. Therefore, heavier traffic decreases the opportunity to transmit the location information as a result of the aforementioned process. Meanwhile, less traffic does not decrease the opportunity to transmit the location information so that the quality of services is improved.

FIG. 1 shows the configuration of a business wireless system 100 according to an embodiment of present invention. The business wireless system 100 includes a first base station device 10a, a second base station device 10b, a third base station device 10c, and a fourth base station device 10d, which are generically referred to as base station devices 10, a first terminal device 12a, a second terminal device 12b, a third terminal device 12c, a fourth terminal device 12d, which are generically referred to as second terminal devices 12, a network 14, and a management device 20. The first base station device 10a forms a first area 16a, the second base station device 10b forms a second area 16b, the third base station device 10c forms a third area 16c, and the fourth base station device 10d forms a fourth area 16d. The first area 16a, the second area 16b, the third area 16c, and the fourth area 16d are generically referred to as areas 16. The number of base station devices 10 and the number of terminal devices 12 are not limited to "4".

The first base station device 10a through the fourth base station device 10d are connected via the network 14. The base station devices 10 are capable of assigning a plurality of channels and assign the respective channels to the groups. A known technology may be used for the channels. By way of example, it will be assumed that the plurality of channels are multiplexed by Time Division Multiple Access (TDMA)/Frequency Division Duplex (FDD). For example, the first base station device 10a defines Ch1, Ch3 through Ch6 as downlink channels and defines Ch2, Ch7 through Ch10 as uplink channels.

Ch1 is used as a downlink control channel and Ch2 is used as an uplink control channel. A combination of Ch3 and Ch7 is assigned to the same group. Ch4 through Ch6 and Ch8 through Ch10 are similarly assigned. The other base station devices 10 assign channels similarly. The number of channels that can be defined may differ depending on the base station device 10 or common to the base station devices 10. If the number of channels that can be defined is common to the base station devices 10, two downlink channels are defined other than the downlink control channel and two uplink channels are defined other than the uplink control channel. A plurality of frequency channels may be used for downlink channels and for uplink channels. It will be assumed that Ch1 and Ch2 are commonly used as the downlink control channel and the uplink control channel, respectively, for all base station devices 10. Referring to FIG. 1, one frequency channel is defined for uplink communication and one frequency channel is defined for downlink communication. However, a plurality of frequency channels may be defined for downlink communication and for uplink communication.

The terminal device 12 is a wireless terminal capable of communicating with another terminal device 12 via the base station device 10. Phone-call communication is assumed. Data communication may take place. Upon entering the area 16, the terminal device 12 request the base station device 10 forming the area 16 to register the location of the terminal device 12. In this process, registration of the group that is used is also requested. These requests are included in the uplink control channel (Ch2) and are transmitted accordingly. Signals in the uplink control channel are transmitted on a random access basis. In response to the request, the base station device 10 registers the terminal devices 12 in units of groups.

When a call request occurs in one of the terminal devices 12, the calling terminal device 12 uses Ch2 to transmit an uplink control channel signal including a call request. The base station device 10 receiving the uplink control channel signal defines the terminal device 12 as the transmitting device and assigns channels to the group in which the transmitting device is included. The term "channel" here generically refers to a downlink channel and an uplink channel. The base station device 10 requests the other base station devices 10 to assign channels to the group via the network 14. In response to the request, the other base station devices 10 examine whether the group is registered. If the group is registered, the other base station devices 10 assign channels to the group.

The base station device 10 and the other base station devices 10 transmit downlink control channel signals including information on the assigned channels to the terminal devices 12. The rest of the terminal devices 12 included in the group (receiving devices) as well as the transmitting device recognize the assigned channels by receiving the downlink control channel signals. The transmitting device transmits a signal to the base station device 10 using the assigned uplink channel. The signal includes a digitized sound signal. If a receiving device is included in the group in which the transmitting device is included, the base station device 10 transmits the signal using the assigned downlink channel. In addition, the base station device 10 transmits the received signal to the other base station devices 10. The other base station devices 10 transmit the signal to the receiving devices using the assigned downlink channel. The receiving devices play back the sound signal based on the received signal and output the sound from the speaker.

A plurality of groups including a plurality of terminal devices 12 are formed. Each of the plurality of base station devices 10 assigns channels in units of groups. As a result, communication takes place between one of the terminal devices 12 included in a group assigned the channels and the rest of the terminal devices 12 included in the group.

In the plurality of terminal devices 12 included in a group, the transmitting device and the receiving device may change their roles. If a signal that should be transmitted is generated in the terminal device 12 operating as the receiving device, the terminal device 12 is switched into a transmitting device by transmitting an uplink control channel signal including a call request. The terminal device 12 operating as the transmitting device is switched into a receiving device once the terminal device 12 completes the transmission of the signal. Intragroup calls such as this use one of the channels of the base station devices 10 when a phone call is generated. Therefore, if the terminal devices 12 included in the same group are registered in the base station devices 10 over an extensive range, one phone call uses as many channels as the base station devices 10. The above-described process is performed in each group.

FIG. 1 shows that a phone call is being made is Group 1. The second terminal device 12b is the transmitting device. The second terminal device 12b transmits a signal using Ch8 of the second base station device 10b. Group 1 is registered in the first base station device 10a and the third base station device 10c. Therefore, the first terminal device 12a receives the signal using Ch3 of the first base station device 10a, and the third terminal device 12c receives the signal using Ch3 of the third base station device 10c. Meanwhile, Group 1 is not registered in the fourth base station device 10d so that the signal from the second terminal device 12b is not output to the fourth base station device 10d.

For example, when Group 1 is registered only in the second base station device 10b, the transmitting device transmits a signal using Ch8 of the second base station device 10b and the receiving device receives the signal using Ch3 of the second base station device 10b. Thus, only a pair of channels of one base station device 10 are used. If Group 1 is registered in two base station devices, one pair of channels are used in each of the two base station devices 10 when a phone call in Group 1 is generated. Therefore, two pairs of channels are used. This is equivalent to consuming as many channels as consumed in one-to-one phone talk in a cell phone system. If Group 1 is registered in three or more base station devices 10, three or more pairs of channels are consumed. If all of the channels in the third base station device 10c are used by other groups, a phone call in Group 1 does not take place in the third base station device 10c. This is equivalent to a missed call or a busy state.

The management device 20 in the business wireless system 100 as described above manages the location information indicating the location at which the terminal devices 12 are located. The terminal device 12 retrieves the location information. The terminal device 12 transmits an uplink control channel signal including the location information to the base station device 10. When the uplink control channel signal is received, the base station device 10 retrieves the location information from the uplink control channel signal and transmits the location information to the management device 20. The management device 20 stores the location information from the base station device 10, mapping the location information to the terminal device 12. When the management device 20 receives new location information corresponding to the terminal device 12 for which the location information is already stored, the management device 20 updates the location information already stored by the new location information.

Figure 2:
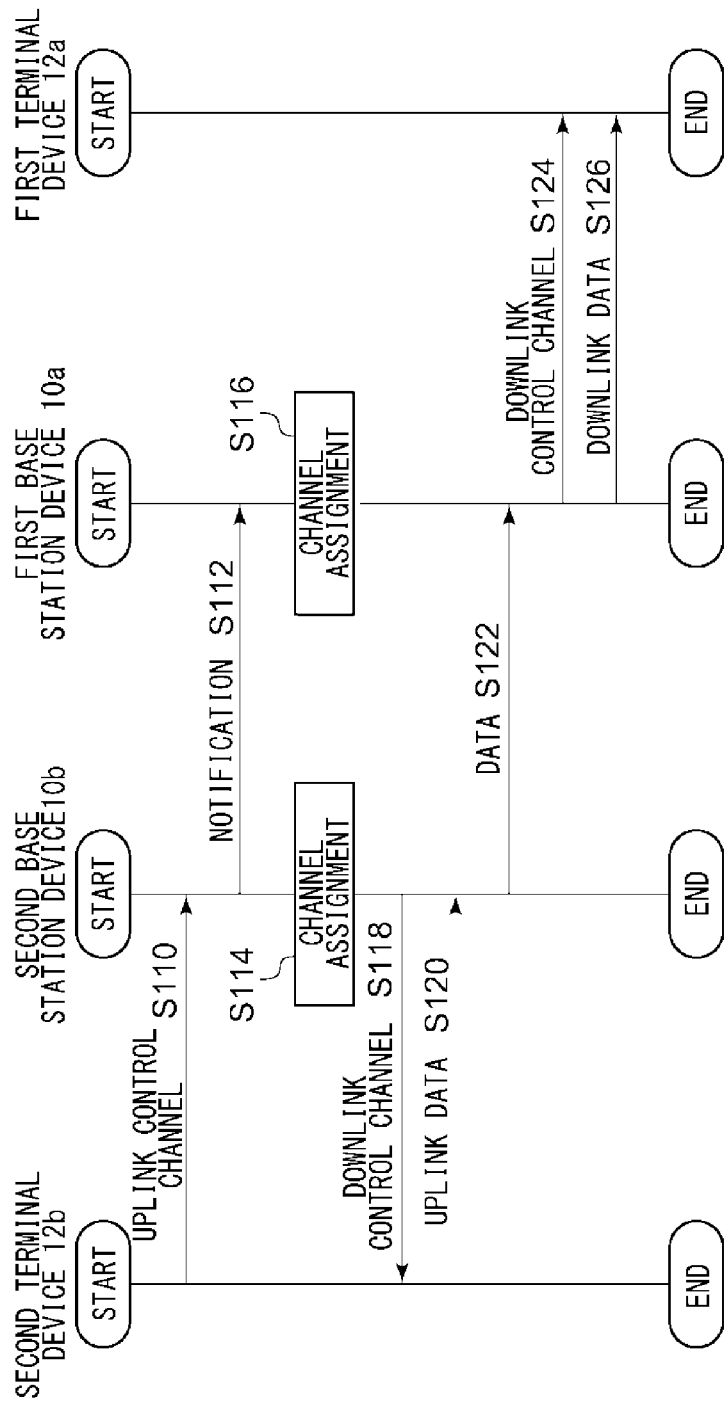
FIG. 2 is a sequence diagram showing the steps of communication in the business wireless system of FIG. 1.

FIG. 2 is a sequence diagram showing the steps of communication in the business wireless system 100. The figure shows the steps of communication normally performed in a group. The second terminal device 12b transmits a call request using the uplink control channel (S110). The second base station device 10b communicates the call request to the first base station device 10a (S112). The second base station device 10b and the first base station device 10a assign channels to Group 1 (S114, S116). The second base station device 10b transmits a result of assignment using the downlink control channel (S118). The second terminal device 12b transmits uplink data to the second base station device 10b (S120). The second base station device 10b transmits the data to the first base station device 10a (S122). The first base station device 10a transmits the result of assignment using the downlink control channel (S124). The first base station device 10a transmits the downlink data to the first terminal device 12a (S126).

Figure 3:
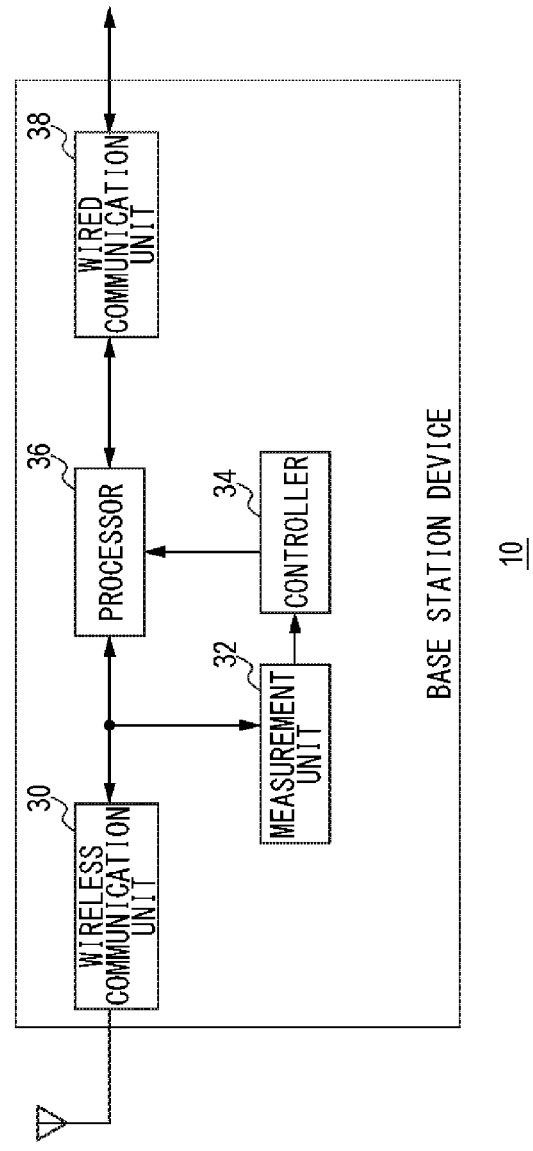
FIG. 3 shows the configuration of the base station device of FIG. 1.

FIG. 3 shows the configuration of the base station device 10. The base station device 10 includes a wireless communication unit 30, a measurement unit 32, a controller 34, a processor 36, and a wired communication unit 38.

The wireless communication unit 30 performs wireless communication with the terminal device 12 by performing a process adapted for the business wireless system 100. The base station device 10 performs TDMA/FDD as described above and so defines a downlink frame and an uplink frame. Each of the downlink frame and the uplink frame is composed of a plurality of slots. The base station device 10 assigns one of the slots of the downlink frame to the downlink control channel and assigns one of the slots of the uplink frame to the uplink control channel. The base station device 10 is also capable of assigning slots included in the downlink frame and the uplink frame to groups. Based on the assignment, the base station device 10 transmits signals to the terminal device 12 and receives signals from the terminal device 12. To transmit a signal, the base station device 10 receives data from the processor 36 and subjects the data to encoding, modulation, frequency transform, and amplification. The base station device 10 subjects the received signal to amplification, frequency transform, demodulation, and decoding, and outputs the decoded data to the processor 36.

The processor 36 performs a process for interfacing between the wireless communication unit 30 and the wired communication unit 38. In other words, the processor 36 outputs data from the wired communication unit 38 to the wireless communication unit 30 and outputs data from the wireless communication unit 30 to the wired communication unit 38. In this process, the processor 36 converts the format of the data. The processor 36 may generate data that should be output to the wireless communication unit 30 or the wired communication unit 38.

The wired communication unit 38 is connected to the network 14 (not shown). The wired communication unit 38 transmits a signal to another base station device 10 or the management device 20 via the network 14. The wired communication unit 38 also receives a signal from another base station device 10 or the management device 20 via the network 14.

Based on such a configuration, the wireless communication unit 30 receives an uplink control channel signal including the location information from the terminal device 12. The wireless communication unit 30 retrieves the location information and a terminal device ID for identifying the terminal device 12 by subjecting the received uplink control channel signal to demodulation, etc. The wireless communication unit 30 outputs a combination of the location information and the terminal device ID to the processor 36. The processor 36 outputs the combination to the wired communication unit 38, and the wired communication unit 38 outputs a signal including the combination to the management device 20 via the network 14.

The measurement unit 32 measures the traffic of communication in the wireless communication unit 30. For example, the measurement unit 32 measures the proportion of slots assigned to the downlink control channel, the uplink control channel, and the groups, in the plurality of slots forming the downlink frame and the uplink frame. In this case, the larger the number of slots occupied, the heavier the traffic. The measurement unit 32 outputs the measured traffic to the controller 34.

The controller 34 receives the traffic from the measurement unit 32. The controller 34 determines a threshold value for the distance of travel of the terminal device 12 in accordance with the traffic. The controller 34 stores a predetermined reference value and compares the reference value with the input traffic. If the traffic is larger than the reference value, the controller 34 sets the threshold value to a first value. If the traffic is equal to or less than the reference value, the controller 34 sets the threshold value to a second value. The first value is larger than the second value. In other words, the controller 34 increases the threshold value as the traffic is increased.

The controller 34 outputs the determined threshold value to the processor 36, and the processor 36 generates a downlink control channel signal including the threshold value. Further, the processor 36 causes the wireless communication unit 30 to transmit the downlink control channel signal to the terminal device 12. When the distance of travel of the terminal device 12 exceeds the threshold value subsequent to the above process, the wireless communication unit 30 receives the uplink control channel signal including the location information from the terminal device 12.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 4:
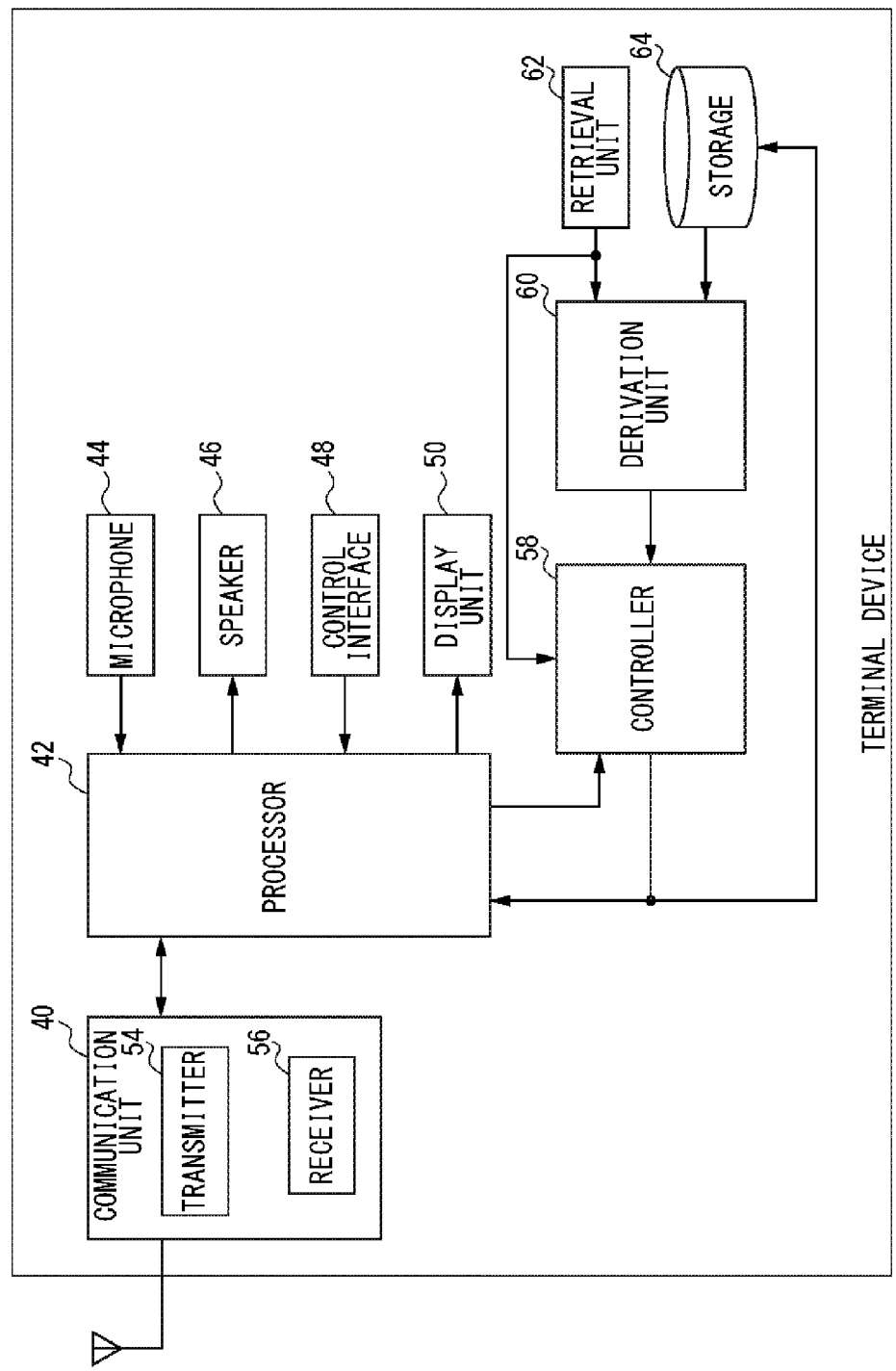
FIG. 4 shows the configuration of the terminal device of FIG. 1.

FIG. 4 shows the configuration of the terminal device 12. The terminal device 12 includes a communication unit 40, a processor 42, a microphone 44, a speaker 46, a control interface 48, a display unit 50, a controller 58, a derivation unit 60, a retrieval unit 62, and a storage 64. The communication unit 40 includes a transmitter 54 and a receiver 56.

The microphone 44 receives sound from the user in a phone call and converts the sound into a sound signal. The microphone 44 outputs the sound signal to the processor 42. The speaker 46 receives the sound signal from the processor 42 in a phone call and outputs the sound signal as sound. The speaker 46 may output alert sound, etc. The control interface 48 is composed of a button, a touch panel, etc. and receives a user input. The control interface 48 outputs the received input to the processor 42. The display unit 50 receives an image and a message from the processor 42 and displays the image and the message. Where a touch panel screen is used, the display unit 50 and the control interface 48 are built as one unit. The display unit 50 may not be included in the terminal device 12. A display device (not shown) may be connected to the terminal device 12 so that the external display device is caused to display information.

The communication unit 40 communicates with the base station device 10 and performs a process adapted for the business wireless system 100. The process performed by the communication unit 40 to receive a sound signal will be described first, followed by a description of the process of transmitting a sound signal from the communication unit 40. In the process performed by the communication unit 40 to receive a sound signal, the receiver 56 receives a downlink control channel signal from the base station device 10 using a predefined slot. The receiver 56 outputs the data included in the downlink control channel to the processor 42. The processor 42 extracts from the data the information related to the channel assigned to the group in which the terminal device 12 is included. The processor 42 designates to the receiver 56 the channel that should be used for reception, based on the extracted information. The receiver 56 receives from the base station device 10 a signal assigned to the slot indicated by the designation. The receiver 56 outputs the sound signal included in the received signal to the processor 42. The processor 42 outputs the sound signal to the speaker 46.

In the process of transmitting a sound signal from the communication unit 40, the transmitter 54 transmits an uplink control channel signal to the base station device 10, using a predefined slot. The receiver 56 receives a downlink control channel signal from the base station device 10, using a predefined slot. The receiver 56 outputs the data included in the downlink control channel signal to the processor 42. The processor 42 extracts from the data the information related to the channel assigned to the group in which the terminal device 12 is included. The processor 42 designates to the receiver 56 the channel that should be used for transmission, based on the extracted information. The transmitter 54 receives a sound signal from the microphone 44 via the processor 42 and transmits a signal including the sound signal using a slot assigned according to the designation.

In addition to the transmission and reception of a sound signal, the terminal device 12 also transmits location information. For the purpose of this process, the receiver 56 receives from the base station device 10 a downlink control channel signal including a threshold value for the distance of travel. The receiver 56 outputs the threshold value included in the downlink control channel signal to the controller 58 via the processor 42.

The retrieval unit 62 receives a signal from a GPS satellite (not shown). The retrieval unit 62 retrieves location information by positioning the terminal device 12 based on the received signal. The location information may be retrieved periodically. A known technology may be used for retrieval of the location information by the retrieval unit 62 so that a description thereof is omitted. The retrieval unit 62 outputs the location information to the derivation unit 60 and the controller 58. The storage 64 stores the past location information transmitted from the transmitter 54. The storage 64 outputs the stored past location information to the derivation unit 60.

The derivation unit 60 receives the past location information from the storage 64 as well as receiving the location information from the retrieval unit 62. The derivation unit 60 derives the distance of travel by referring to the location information and the past location information. More specifically, the derivation unit 60 derives the distance of travel by performing vector operation to calculate the linear distance between the past location information and the location information newly retrieved by the retrieval unit 62. The derivation unit 60 may derive a cumulative distance of travel from the location information transmitted in the past from the transmitter 54, each time the location information is retrieved subsequently at periodical intervals. The derivation unit 60 outputs the derived distance of travel to the controller 58.

The controller 58 receives the threshold value from the processor 42 and stores the threshold value. The controller 58 also receives from the derivation unit 60 the distance of travel. If the distance of travel exceeds the threshold value, the controller 58 outputs the location information newly retrieved by the retrieval unit 62 to the processor 42. In this process, the controller 58 causes the storage 64 to store the location information. Meanwhile, if the distance of travel is equal to or less than the threshold value, the controller 58 stops the transmission of the location information newly retrieved by the retrieval unit 62 by stopping the process. When the processor 42 receives the location information from the controller 58, the processor 42 generates an uplink control channel signal including the location information and the terminal ID and outputs the resultant signal to the transmitter 54. The transmitter 54 transmits the uplink control channel signal to the base station device 10 from the processor 42. The controller 58 also causes the storage 64 to store the time that the location information is transmitted last. If a predetermined period of time has elapsed since the location information was transmitted last, the controller 58 may transmit the latest location information even if the distance of travel is equal to or less than the threshold value. The time may be obtained when the retrieval unit 62 retrieves the location information.

Figure 5:
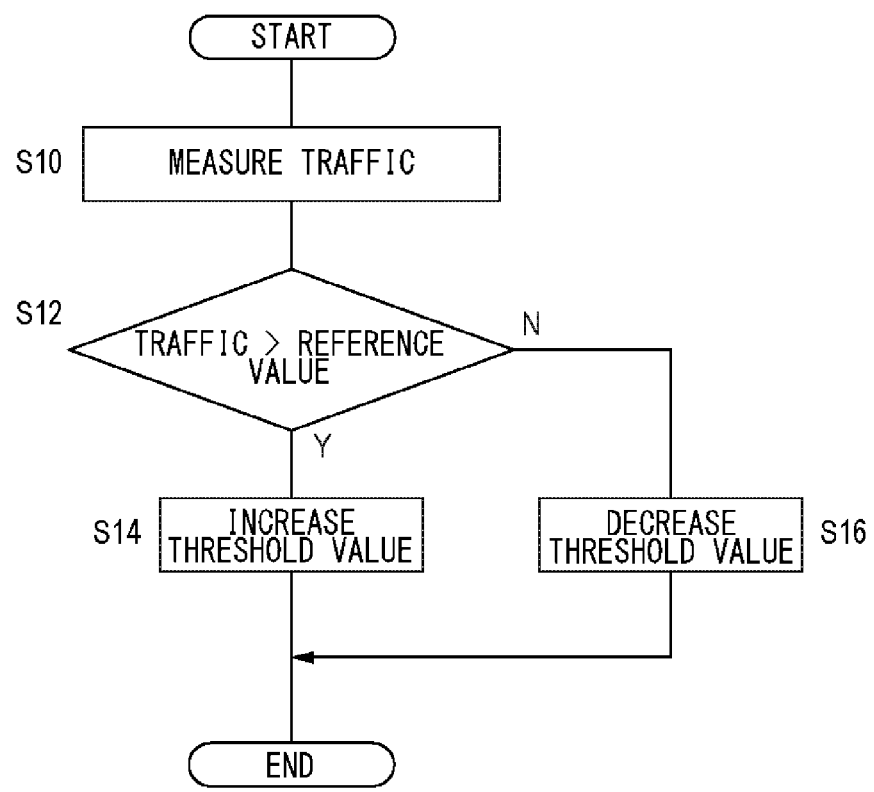
FIG. 5 is a flowchart showing the steps performed by the base station of FIG. 3 to determine a threshold value.

A description will now be given of the operation of the business wireless system 100 configured as described above. FIG. 5 is a flowchart showing the steps performed by the base station device 10 to determine a threshold value. The measurement unit 32 measures the traffic (S10). If the traffic is more than the reference value (Y in S12), the controller 34 increases the threshold value by setting the threshold value to a first value (S14). Meanwhile, if the traffic is not more than the reference value (N in S12), the controller 34 decreases the threshold value by setting the threshold value to a second value (S16).

Figure 6:
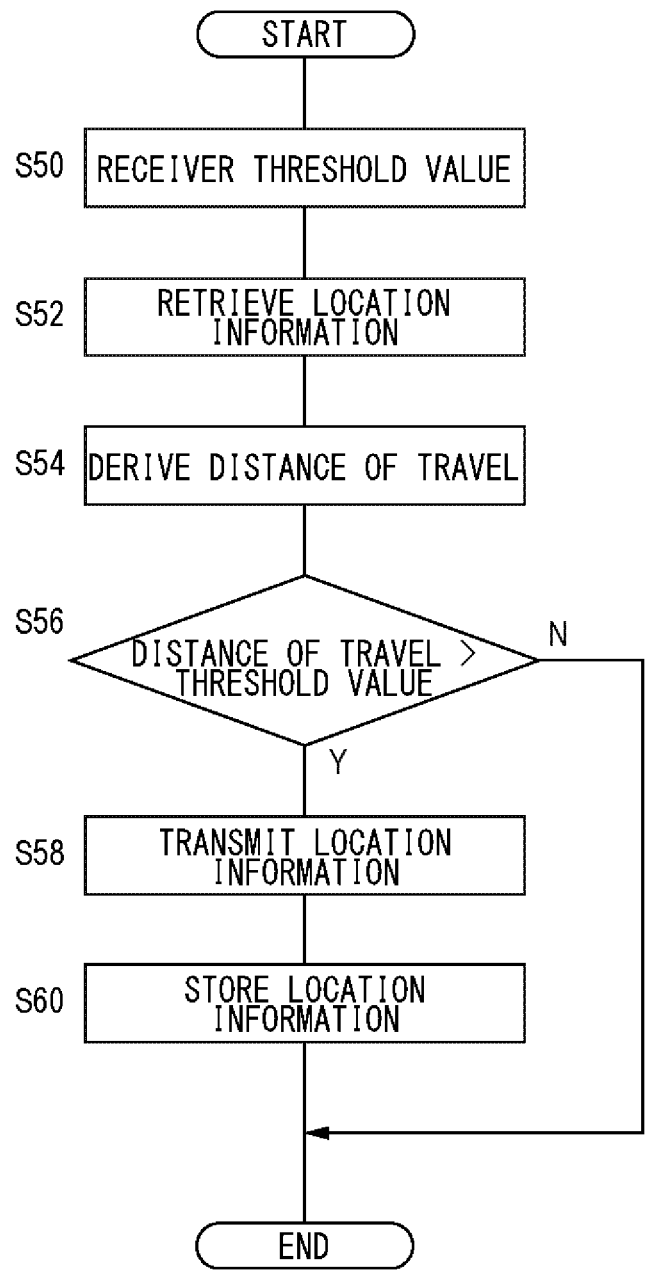
FIG. 6 is a flowchart showing the steps performed by the terminal device of FIG. 4 to transmit the location information.

FIG. 6 is a flowchart showing the steps performed by the terminal device 12 to transmit the location information. The receiver 56 receives the threshold value (S50). The retrieval unit 62 retrieves the location information (S52). The derivation unit 60 derives the distance of travel (S54). If the distance of travel is larger than the threshold value (Y in S56), the controller 58 causes the processor 42 and the transmitter 54 to transmit the location information (S58) and causes the storage 64 to store the location information (S60). Meanwhile, if the distance of travel is not larger than the threshold value (N in S56), step 58 and step 60 are not performed.

According to the embodiment, the location information is transmitted if the distance of travel exceeds the threshold value. Accordingly, the traffic load in the transmission of location information from the terminal device is prevented from growing. Since the traffic is prevented from growing, impact on the intrinsic communication is reduced. Whether or not the location information is transmitted is determined by referring to the threshold value for the distance of travel so that the process can be performed merely by communicating the threshold value to the terminal device. Since the only requirement is to transmit the threshold value to the terminal device, the amount of information that should be communicated is reduced. Since the level of threshold value is adjusted in accordance with the traffic, the frequency of transmitting the location information can be adjusted in accordance with the traffic. Further, if the traffic is not heavy, the frequency of transmitting the location information of the terminal device is not reduced so that the quality is services is improved. Since the distance of travel is calculated as a linear distance, the process is simplified.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment of the present invention, the business wireless system 100 is used as a wireless communication system. However, the type of the system is non-limiting. For example, a wireless communication system other than the business wireless system 100 may be used. An example of the wireless communication system other than the business wireless system 100 is a cell phone system. According to this variation, the scope of application of the embodiment is expanded.

According to the embodiment, the management device 20 is connected to the network 14. Alternatively, however, the management device 20 may be built in one of the base station devices 10. According to this variation, the flexibility of the configuration is improved.

According to the embodiment, the terminal device 12 uses an uplink control channel to transmit the location information. However, the terminal device 12 may include the location information in an uplink channel assigned by the base station device 10 and used for transmission of a sound signal, and transmit the location information accordingly. Still alternatively, the terminal device 12 may include the location information in an uplink channel assigned by the base station device 10 and separate from the channel for transmission of a sound signal, and transmit the location information accordingly. According to this variation, the flexibility of the configuration is improved.

In the embodiment of the present invention, the controller 34 sets two-stage threshold values, namely, the first value and the second value. Alternatively, however, the controller 34 may set a plurality of stages of threshold values depending on the traffic. According to this variation, the traffic load in the transmission of location information can be controlled in a detailed manner.

What is claimed is:

1. A terminal device comprising:
    a retrieval unit that retrieves location information and time information;
    a communication unit that transmits the location information retrieved by the retrieval unit to a base station device and receives from the base station device a threshold value for a distance of travel determined by a traffic of communication;
    a storage that stores the location information transmitted from the communication unit and stores the retrieved time information;
    a derivation unit that derives the distance of travel based on the location information stored in the storage and the location information newly retrieved by the retrieval unit; and
    a controller that causes the communication unit to transmit the location information newly retrieved by the retrieval unit, if the distance of travel derived by the derivation unit exceeds the threshold value;
    if the distance of travel derived by the derivation unit is equal to or less than the threshold value, the controller stops transmission of the location information newly retrieved by the retrieval unit, and
    if a predetermined period of time has elapsed since the time indicated by the time information stored in the storage, the controller transmits the location information newly retrieved by the retrieval unit.

2. The terminal device according to claim 1, wherein the derivation unit derives the distance of travel by calculating a linear distance between the location information stored in the storage and the location information newly retrieved by the retrieval unit.

3. The terminal device according to claim 2, wherein the retrieval unit retrieves time information along with the location information,
    the storage stores the retrieved time information along with the location information transmitted from the communication unit,
    if the distance of travel derived by the derivation unit is equal to or less than the threshold value, the controller stops transmission of the location information newly retrieved by the retrieval unit, and
    if a predetermined period of time has elapsed since the time indicated by the time information stored in the storage, the controller transmits the location information newly retrieved by the retrieval unit.

4. A base station device comprising:
    a communication unit that performs communication with a terminal device;
    a measurement unit that measures a traffic of communication in the communication unit; and
    a controller that determines a threshold value for a distance of travel of the terminal device in accordance with the traffic measured by the measurement unit and causes the communication unit to transmit the determined threshold value to the terminal device, wherein
    the communication unit receives location information that is transmitted if the terminal device travels beyond the threshold value,
    the communication unit stops receiving location information that is transmitted if the terminal device travels equal to or below the threshold value,
    the communication unit receives location information that is transmitted if a predetermined period of time has elapsed, and
    the controller controls the threshold value such that the heavier the traffic, the larger the threshold value.

5. A communication system comprising:
    a base station device; and
    a terminal device that transmits retrieved location information to the base station device and receives from the base station device a threshold value for a distance of travel, wherein
    the base station device includes:
        a measurement unit that measures a traffic of communication with the terminal device; and
        a controller that determines a threshold value such that the heavier the traffic measured by the measurement unit, the larger the threshold value, and transmits the determined threshold value to the terminal device, and wherein
    the terminal device includes:
        a retrieval unit that retrieves location information and time information;
        a communication unit that transmits the location information retrieved by the retrieval unit to a base station device and receives from the base station device a threshold value for a distance of travel determined by a traffic of communication;
        a storage that stores the transmitted location information and stores the retrieved time information;
        a derivation unit that derives the distance of travel based on the location information stored in the storage and the newly retrieved location information; and
        a controller that causes the newly retrieved location information to be transmitted, if the distance of travel derived by the derivation unit exceeds the threshold value;
        if the distance of travel derived by the derivation unit is equal to or less than the threshold value, the controller stops transmission of the location information newly retrieved by the retrieval unit, and
        if a predetermined period of time has elapsed since the time indicated by the time information stored in the storage, the controller transmits the location information newly retrieved by the retrieval unit.

* * * * *